United States Patent
Rutkowski et al.

(10) Patent No.: US 8,178,249 B2
(45) Date of Patent: May 15, 2012

(54) FUEL CELL HUMIDITY CONTROL SYSTEM AND METHOD

(75) Inventors: Brian D. Rutkowski, Ypsilanti, MI (US); Shazad Mahmood Butt, Troy, MI (US); Scott Michael Sabin, New Hudson, MI (US); Mujeeb Ismael Ijaz, Leonard, MI (US)

(73) Assignee: Ford Motor Company, Dearborn, MI (US)

( * ) Notice: Subject to any disclaimer, the term of this patent is extended or adjusted under 35 U.S.C. 154(b) by 1092 days.

(21) Appl. No.: 11/764,249

(22) Filed: Jun. 18, 2007

(65) Prior Publication Data

US 2008/0311438 A1 Dec. 18, 2008

(51) Int. Cl.
*H01M 8/04* (2006.01)
(52) U.S. Cl. ........................................ 429/413; 429/408
(58) Field of Classification Search .................... None
See application file for complete search history.

(56) References Cited

U.S. PATENT DOCUMENTS

| | | | |
|---|---|---|---|
| 6,706,430 B2 * | 3/2004 | Wheat et al. | 429/413 |
| 6,777,120 B2 * | 8/2004 | Nelson et al. | 429/413 |
| 6,818,335 B2 | 11/2004 | Edlund et al. | |
| 6,939,629 B2 | 9/2005 | Katagiri et al. | |
| 6,939,631 B2 | 9/2005 | Formanski et al. | |
| 2003/0096145 A1 | 5/2003 | Sugawara et al. | |
| 2003/0170506 A1 | 9/2003 | Gilbert | |
| 2005/0077364 A1 * | 4/2005 | Hwang | 236/44 C |
| 2007/0298295 A1 * | 12/2007 | Daly et al. | 429/23 |

* cited by examiner

*Primary Examiner* — John S Maples
(74) *Attorney, Agent, or Firm* — Brooks Kushman P.C.

(57) ABSTRACT

A control system for controlling the amount of water in at least one fluid stream that is passed through a fuel cell stack comprises a humidifier arrangement, a sensor and a controller. The humidifier arrangement is operable to humidify the fluid stream. The sensor is disposed downstream of the humidifier arrangement and configured to measure at least one characteristic of the fluid stream. The at least one characteristic of fluid stream is indicative of the amount of water in the fluid stream. The controller is configured to receive a signal from the sensor and to use the signal to determine a difference between an amount of water in the fluid stream and a target amount of water. The controller is operable to control the humidifier arrangement to control the amount of water in the fluid stream based on the difference.

13 Claims, 3 Drawing Sheets

FUEL CELL HUMIDITY CONTROL SYSTEM AND METHOD

BACKGROUND

1. Field of the Invention

Embodiments of the present invention relate to a system and method for monitoring the amount of humidity in a fuel cell stack system, and more particularly to a system and method for controlling the amount of water in air and hydrogen streams that are passed through a fuel cell stack.

2. Background Art

It is generally well known that a number of fuel cells are joined together to form a fuel cell stack. Such a stack generally provides electrical power in response to converting chemicals from hydrogen and oxygen. It is also generally well known that membranes of each fuel cell must be kept moist in order to keep the membranes from being damaged. Conventional systems deliver water in the air and hydrogen streams to ensure that such membranes are kept moist. While it is important to ensure that membranes are kept moist, it is equally important not to deliver too much water in the air and hydrogen streams since such excess water may clog the membranes and lead to inefficient operation of the fuel cells in the stack.

Accordingly, it would be desirable to provide a system and method that provides an appropriate amount of moisture in the air and hydrogen streams prior to such streams being delivered to the membranes of a fuel cell. It would also be desirable to add a diagnostic component to a system that delivers water to air and hydrogen streams. Such a diagnostic component may prevent damage to the fuel cell system stack by completely shutting the system down when a failure is detected or by notifying a user of the failure.

SUMMARY OF THE INVENTION

In one aspect of the present invention, a control system for controlling the amount of water in at least one fluid stream, for example, an air stream or a hydrogen stream that is passed through a fuel cell stack is provided. The system comprises a humidifier arrangement, a sensor and a controller. The humidifier arrangement is disposed upstream of the fuel cell stack and is operable to humidify the fluid stream. The sensor is disposed downstream of the humidifier arrangement and configured to measure at least one characteristic of the fluid stream. The at least one characteristic of water is indicative of the amount of water in the fluid stream. The controller is configured to receive a signal from the sensor and to use the signal to determine a difference between an amount of water in the fluid stream and a target amount of water. The controller is operable to control the humidifier arrangement to control the amount of water in the fluid stream based on the determined difference.

By controlling the amount of water to be added to or removed from the fluid stream, the controller ensures that an appropriate amount of humidity is being delivered to the fuel cell stack for proper operation.

In another aspect of the present invention, a control system for controlling the amount of water in first and second fluid streams that are passed through a fuel cell stack in a fuel cell system and detecting failures in the fuel cell system is provided. The system comprises a first humidifier arrangement, a second humidifier arrangement, a first sensor, a second sensor, and a controller. The first humidifier arrangement is operable to humidify the first fluid stream. The second humidifier arrangement is operable to humidify the second fluid stream. The first sensor is configured to measure at least one first characteristic of the first fluid stream. The at least one first characteristic of the first flow stream is indicative of the amount of water in the first fluid stream. The second sensor is configured to measure at least one second characteristic of the second fluid stream. The at least one second characteristic of the second fluid stream is indicative of the amount of water in the second fluid stream. The controller is configured to receive a first signal from the first sensor and a second signal from the second sensor. The controller independently controls the first and second humidifier arrangements to control the amount of water in the first and the second fluid streams and detects whether the first and second humidifier arrangements have controlled the amount of water in the first and second fluid streams by a predetermined amount.

By detecting whether the first and the second humidifier arrangements have controlled the amount of water in the first and second fluid streams by a predetermined amount after controlling the amount of water in the first and the second fluid streams, the system may mitigate or avoid damage to the fuel cell stack caused by having too much or too little water in the fluid streams. In addition, such a failure detection may notify the user of a problem in the overall system and allow maintenance costs to be minimized. In addition, the failure detection may allow the system to shut down automatically when a failure has been detected.

In another aspect of the present invention, a method of controlling the amount of water in first and second fluid streams that are passed through first and second humidifier arrangements and a fuel cell stack in a fuel cell system is provided. The method comprises humidifying the first and the second fluid streams, measuring at least one characteristic of water in the first fluid stream which is indicative of the amount of water in the first fluid stream, measuring at least a second characteristic of water in the second fluid stream which is indicative of the amount of water in the second fluid stream; determining a first difference between an amount of water in the first fluid stream and a target amount of water, determining a second difference between an amount of water in the second fluid stream and a second target amount, controlling the amount of water in the first fluid stream based on the first difference, and controlling the amount of water in the second fluid steam based on the second difference.

Embodiments of the present invention may be implemented for any number of systems which utilize fuel cell technology. Embodiments of the present invention may provide a closed loop system for ensuring the delivery of humidity to membranes of a fuel cell.

DETAILED DESCRIPTION OF THE PREFERRED EMBODIMENT(S)

Figure 1:
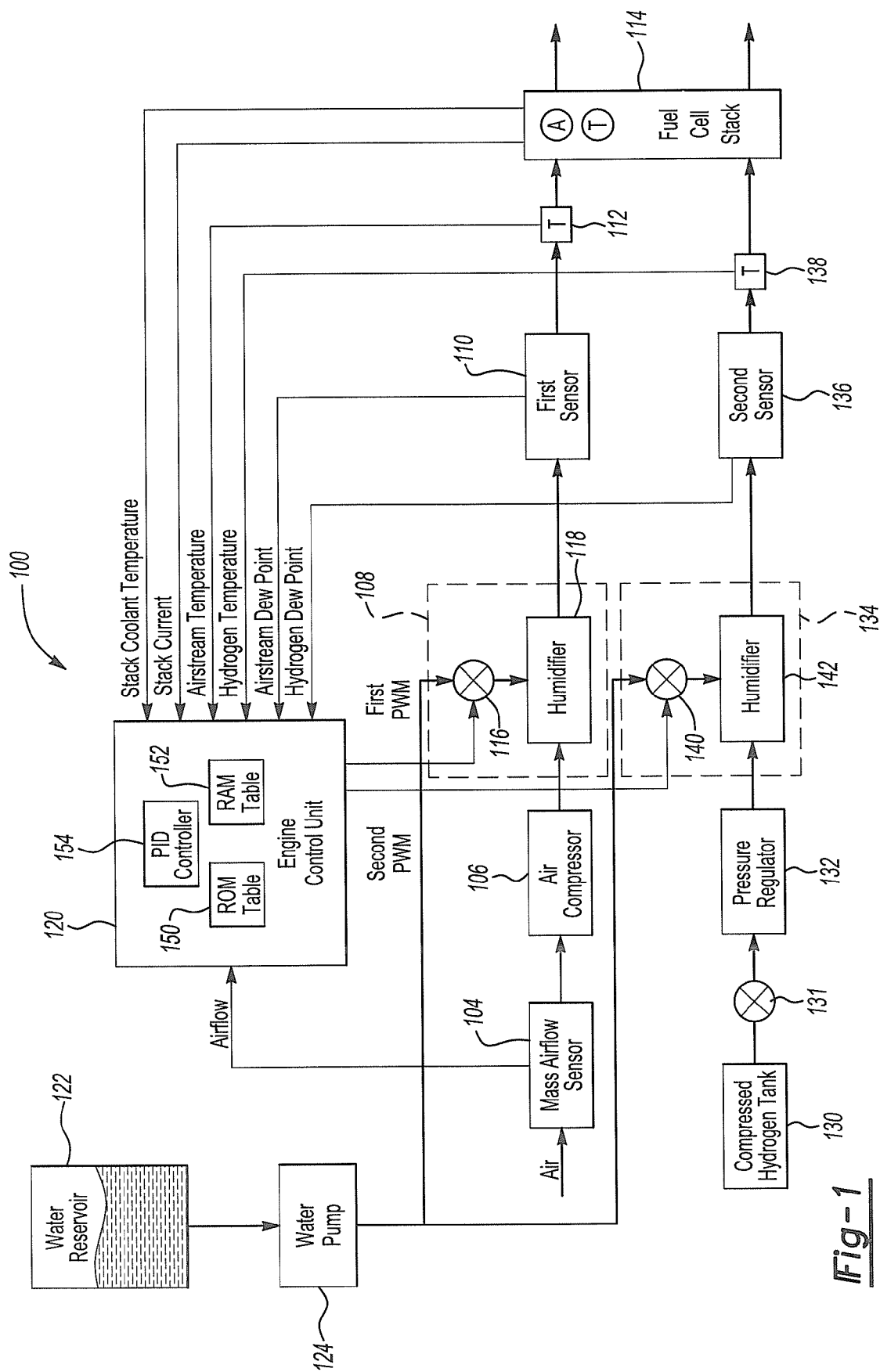
FIG. 1 illustrates an exemplary fuel cell stack humidity control system in accordance with one embodiment of the present invention.

FIG. 1 illustrates an exemplary fuel cell stack humidity control system 100 in accordance to one embodiment of the present invention. The system 100 may be implemented in an electric vehicle or hybrid vehicle or any such vehicle which uses voltage to drive a motor.

A first fluid stream which comprises air is fed to mass airflow sensor 104. The air passing through the mass airflow sensor 104 may be dry air, or it may have a high water content. The mass airflow sensor 104 measures the amount and density of air in the fluid stream. An air compressor 106 pressurizes the air stream.

A first humidifier arrangement 108 is configured to add water in the air stream. A first sensor 110 measures the dew point in the air stream. In one example, the first sensor 110 may be implemented as a capacitive complementary metal oxide semiconductor (CMOS) sensing element. The dew point is generally a function of relative humidity and temperature. The first sensor 110 may be adapted to measure any number of characteristics related to determining the amount of water in the air. A temperature sensor 112 measures the temperature of the air after the first sensor 110 has measured the dew point in the air. A fuel cell stack 114 receives the humidified air.

The first humidifier arrangement 108 includes a water injector 116 and a humidifier 118. A controller 120 may control the water injector 116 with a first pulse width modulated (PWM) signal. The water injector 116 may be implemented as a solenoid or other valve and control the amount of water that is being added to humidifier 118 in response to the first PWM signal.

In one example not shown, the water injector valve 116 may be positioned between the mass air flow sensor 104 and the air compressor 106. In such an example, the water injection valve 116 may inject water directly into the compressor 106 and the humidifier 118 may be eliminated from the system 100.

A water pump 124 is coupled to the water injector 116. A water reservoir 122 provides water to the water injector 116 via the water pump 124. In one example, the fuel cell stack 114 may provide a water supply to the water reservoir 122. For example, the fuel cell stack 114 may generate the water in response to combining chemicals from the air stream and the hydrogen stream. An output of the fuel cell stack 114 may provide water to the water reservoir 122.

A tank 130 of compressed hydrogen provides a second fluid stream comprising compressed hydrogen that can be used by the fuel cell stack 114. A tank valve 131 controls the flow of hydrogen entering into the system 100. A pressure regulator 132 regulates the flow of the hydrogen. A second humidifier arrangement 134 is configured to add water into hydrogen stream.

The second humidifier arrangement 134 includes a water injector 140 and a humidifier 142. The controller 120 may control the water injector 140 with a second PWM signal. The water injector 140 may be implemented as a solenoid or other valve and control the amount of water that is being added to humidifier 118 in response to the second PWM signal. The humidifier 142 introduces water into the hydrogen stream in response to the amount of water received by the water injector 140. The water pump 124 is coupled to the water injector 140. The water reservoir 122 provides water to the water injector 140 via the water pump 124.

The second sensor 136 measures the dew point in the hydrogen stream. In one example, the second sensor 136 may be implemented as a CMOS sensing element. The dew point is generally a function of relative humidity over temperature. The second sensor 136 may be adapted to measure any number of characteristics related to the amount of water in the hydrogen stream. A temperature sensor 138 measures the temperature of the hydrogen. The fuel cell stack 114 may receive the humidified hydrogen stream.

The fuel cell stack 114 generally comprises a number of fuel cells (not shown) for generating power to drive a motor. In general, each fuel cell converts oxygen from the air stream and hydrogen stream to produce water thereby generating electricity. The fuel cell stack 114 generates stack current in response to each fuel cell converting oxygen and hydrogen into water. Such stack current may drive an electric motor (not shown) coupled to the fuel cell stack 114. The fuel cell stack 114 may provide information related to the stack current to the controller 120 via a current sensor (not shown). The current sensor may be coupled between the controller 120 and an electrical connection of the fuel cell stack 114. The information related to the amount of time the fuel cell stack 114 has been operating may be defined as the time since start. The time since start is based on the amount of time the tank valve 131 and the tank 130 has been open.

The controller 120 includes a Read Only Memory (ROM) 150 and a Keep Alive Memory (KAM) 152. The ROM 150 generally comprises a first feed forward table (not shown) and a second feed forward table (not shown). The KAM 152 may be implemented as a Random Access Memory (RAM). The first and second feed forward tables include mapped values which are used by the controller 120 to control the amount of water to be added or removed in the air and hydrogen streams. Such mapped values are generally predefined and based on steady state conditions to meet target humidification dew points.

The system 100, while operating under known conditions or in a first mode, may use the mapped values of the first feed forward table to control the amount of water in the air streams. The system 100 may be in the first mode after the system 100 has been started. The first feed forward table is based on a function of airflow and temperature in the air stream. In one example, the first feed forward table may be used by the controller 120 to control the amount of water in the air stream based on particular operating conditions without monitoring the airflow and the temperature. In such an example, the system 100 may be operating in an open loop system. In another example, the controller 120 may monitor the rate of airflow and the temperature of the air stream to establish a closed loop system. If the measured airflow rate and measured temperature correspond to values defined in the first feed forward table, the controller 120 controls the amount of water in the air stream by controlling the flow rate of the water injector 116 with the first PWM signal.

For the hydrogen stream, the controller 120 uses the mapped values of the second feed forward table to adjust the amount of water in the hydrogen stream. The second feed forward table is based on a function of the stack current generated from the fuel cell stack 114 (via the current sensor) and temperature in the hydrogen stream. In one example, the second feed forward table may be used by the controller 120 to control the amount of water in the hydrogen stream based on particular operating conditions without monitoring the stack current and the temperature. In such an example, the system 100 may be operating in an open loop system. In another example, the controller 120 may monitor the stack current and the temperature in the hydrogen stream to establish a closed loop system. If the stack current and the temperature correspond to values defined in the second feed forward table, the controller 120 controls the amount of water in the hydrogen stream by controlling a valve flow rate of the water injector 140 with the second PWM signal.

While the system 100 is operating in the first mode and in a closed loop format, the controller 120 may continue to monitor the dew point in the air and hydrogen streams via the first sensor 110 and the second sensor 136 to ensure proper dew points are being achieved based on the predefined values of the first and the second feed forward tables. If the proper dew points are not being achieved and the controller detects via the first sensor 110 and/or the second sensor 136 that the proper dew point is not within a predetermined amount, the controller 120 shuts the system 100 down to prevent any damage to the fuel cell stack 114. In one example, the controller 120 may trigger fault codes and shut the system 100 down if the desired dew point is not within 30% to 50% of the desired dew point level. In general, the controller 120 may monitor all inputs being received and set fault codes if any of the inputs received from the mass airflow sensor, the first and second sensors 118 and 136, the air temperature sensor 112, the hydrogen temperature sensor 138, and the fuel cell stack 114 are not operating correctly.

If the temperature measured from the air stream and the hydrogen stream is greater than a programmable threshold, the system 100 may be in a second mode. While in the second mode, it may be necessary to achieve a target dew point at an inlet to the fuel cell stack 114. Such a target dew point may not be achievable if the system 100 is to continue to operate solely in the first mode since the feed forward tables may not include the corresponding airflow rates and stack current rates needed to achieve the target dew point. While in the second mode, the system 100 may continue to use the feed forward tables of the first mode to control the amount of water in the air and hydrogen streams; however, the second mode provides additional control over the water injectors 116 and 140 for allowing greater precision over the amount of water to be added or removed in the air and hydrogen streams.

In the second mode, the system 100 may independently control the amount of water in the air stream based on a first target dew point and control the amount of water in the hydrogen stream based on a second target dew point. The controller 120 includes a proportional, integral and derivative controller (PID) controller 154. The PID controller 154 may allow the system 100 to effectively achieve the first and second target dew points in the air and hydrogen streams. Other types of controllers such a lead/lag controllers may be used for achieving the first and second target dew points. The particular type of controller used may be varied to meet the design criteria of a particular implementation.

The first target dew point is defined as function of stack coolant temperature, the time since start and stack current of the fuel cell stack 114. The fuel cell stack 114 presents signals related to the stack current and stack coolant temperature to the controller 120. While in the second mode, the controller 120 determines a first difference. The first difference is the difference between the first target dew point and the first measured dew point as measured by the first sensor 110. The PID controller 154 determines a first difference rate and a first difference integral. The first difference rate is defined as the difference between the first difference and a previous difference divided by a delta_time value. The previous difference for the first difference rate is the last known difference value calculated before the first difference is calculated. The delta_time value may be set to a predetermined value of time which represents the time between software execution loops. In one example, the delta_time value may be set to 100 msec. The value of delta_time value may be varied to meet the design criteria of a particular implementation. The first difference integral is defined as the summation of all of the past first difference measurements and the most recent calculation of the first difference.

The PID controller 154 scales a proportional gain with the first difference, an integral gain with the first difference integral and a derivative gain with the first difference rate. After the PID controller 154 scales the proportional term, the integral term and the derivative term, the PID controller 154 sums the terms together to determine a final PID correction value. The controller 120 may adjust the first PWM signal based on the final PID correction value and control the flow rate of the water injector 116 accordingly.

The second target dew point is defined as function of stack coolant temperature, the time since start and stack current of the fuel cell stack 114. While the system 100 is in the second mode, the controller 120 determines a second difference. The second difference is the difference between the second target dew point and the second measured dew point as measured by the second sensor 136. The PID controller 154 determines a second difference rate and a second difference integral. The second difference rate is defined as the difference between the second difference and a previous difference divided by the delta_time value. The previous difference for the second difference rate is the last known difference value calculated before the second difference is calculated. The delta_time value may be set to a predetermined value of time which represents the time between software execution loops. In one example, the delta_time value may be set to 100 msec. The value of delta_time value may be varied to meet the design criteria of a particular implementation. The second target dew point is defined as the rate of error over time. The second difference integral is defined as the summation of all of the past second difference values and the most recent calculation of the second difference.

The PID controller 154 scales the proportional gain with the second difference, the integral gain with the second difference integral and the derivative gain with the second difference rate. After the PID controller 154 scales the proportional term, the integral term and the derivative term, the PID controller 154 sums the terms together to determine a final PID correction value. The controller 120 may adjust the second PWM signal based on the final PID connection value and control the flow rate of the water injector 140.

The system 100 may also operate in a third mode. In the third mode, information related to the amount of water added or removed in the air and hydrogen streams may be updated (or learned) and saved. The system 100 may operate simultaneously in the first mode, second mode and the third mode. The controller 120 may adjust the flow rate of the injectors 116 and 140 to compensate for noise in the system 100. For example, the water injectors 116 and 140 may have part to part variations related to the minimum pulse width. An adaptive cell may be needed to accommodate for such variations and learned over time. In general, the system 100 may wait a predetermined amount of time before enabling the learning of such variations. While in the third mode, the system 100 is configured to slowly learn hardware corrections to avoid performing corrections for transient conditions.

The KAM 152 includes a first KAM table (not shown) and a second KAM table (not shown). The first KAM table stores learned values over time that are associated with the amount of control of water in the air stream. Such learned values are stored in the KAM and remain available in the first KAM table after key off (or when the system 100 is turned off). The second KAM table stores learned values over time that are associated with the amount of control of water in the hydrogen stream. Such learned values are stored in the KAM and remain available in the second KAM table after key off (or when the system 100 is turned off).

The PID controller 154 provides integral correction to the first and second KAM tables for storing learned values. Since the integral term for the PID controller 154 stores the correction (or correction value) needed to make the difference between target and measured dew points equal to zero, the integral term represents the amount that the system 100 should learn (or adapt) and apply the next time a similar set of conditions are encountered. The first and second KAM tables may each learn a single value, or multiple points as a function of airflow or stack current. In the case of first feed forward table which is based on airflow, the first KAM table may adaptively learn points as a function of airflow and control the amount of water in the air stream accordingly. In the case of the second feed forward table which is based on stack current, the second KAM table may adaptively learn points as a function of stack current and control the amount of water in the hydrogen stream accordingly. In general, the first and second KAM tables should be small enough to learn quickly, but large enough to correct different system errors.

While the system 100 is operating in the second and third modes, the controller 120 may continue to monitor the dew point in the air and hydrogen streams via the first sensor 110 and/or the second sensor 136 to ensure that the proper dew points are being achieved. For example, if the controller 120 detects via the first sensor 110 and/or the second sensor 136 that the desired dew point is not within a predetermined amount, the controller 120 may detect that a failure has occurred and shuts the system 100 down to prevent damage to the fuel cell stack 114. In one example, the controller 120 may trigger a fault code and shut the system 100 down or enter a limp home mode if the measured dew points are not within 30% to 50% of the desired dew point level.

Figure 2:
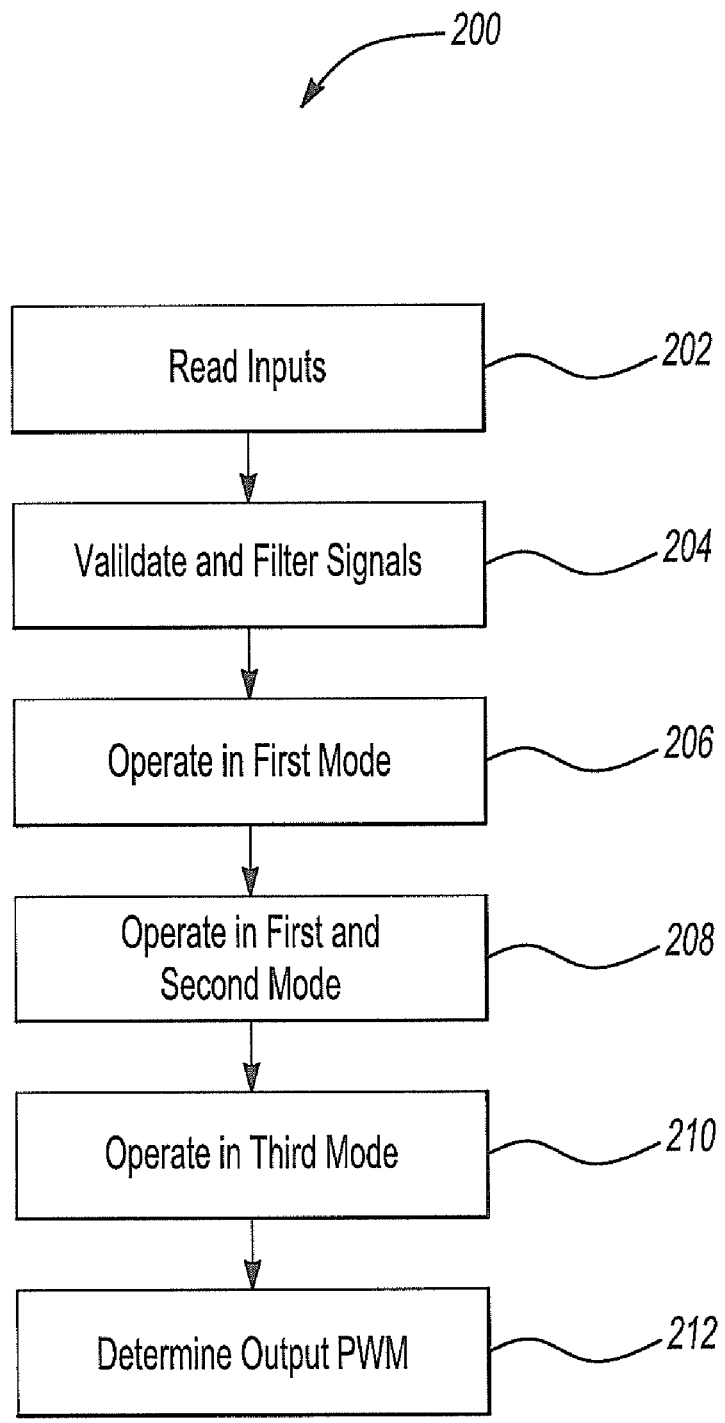
FIG. 2 illustrates a flow diagram for controlling the amount of water being added to an air stream and a hydrogen stream in accordance with one embodiment of the present invention.

FIG. 2 illustrates a flow diagram 200 for controlling the amount of water being added to the air and hydrogen streams. In step 202, the controller 200 reads inputs related to the airflow rate of the air stream, the stack current of the fuel cell stack 114, the time since start, the stack temperature of the fuel cell stack 114, the measured dew points related to the air and hydrogen streams, and the temperature of the air and hydrogen streams. In step 204, the controller 120 may validate and filter the signals received as indicated in step 202.

In step 206, the system 100 operates in the closed loop system of the first mode, and the first feed forward table in the ROM 150 uses the airflow of the air stream to control the amount of water in the air stream by controlling the water injector 116. The second feed forward table in the ROM 150 uses the stack current of the fuel cell stack 114 to control the amount of water in the hydrogen stream by controlling the water injector 142. The first and second feed forward tables generally define the flow rate of water for the water injectors 116 and 140. In general, the system 100 operates in the first mode when the system 100 is initialed started.

In step 208, the system 100 may continue to operate initially in the first mode; however, it may be necessary to control the amount of water in the air and hydrogen streams in order to achieve target dew points. Such target dew points are measured at the inlet of the fuel cell stack 114. If the system 100 is operating in the first mode, the first and second feed forward tables may not effectively control the amount of water in the air and hydrogen streams to reach the target dew points. The system 100 may enter the second mode if the temperature in the air and hydrogen streams are greater than programmable thresholds. While in the second mode, the system 100 provides for additional control of the flow of water in the air and hydrogen streams and compensates for flow rates that cannot be provided by the first and second feed forward tables of the first mode.

In the second mode, the controller 120 determines the first difference. The controller 120 may further control the flow rates of water in the air stream by scaling the first difference, the first difference rate and the first difference integral with the gains of the PID controller 152. The scaled gains of the PID controller 152 are summed and the PID controller 152 generates a final PID correction value. The final PID correction value is used to control the water injector 116. The water injector 116 may increase or decrease the amount of water into the air stream to achieve the first target dew point.

In the second mode, the controller 120 determines the second difference. The controller 120 may further control the flow rates of water in the hydrogen stream by scaling the second difference, the second difference rate and the second difference integral with the gains of the PID controller 152. The scaled gains of the PID controller 152 are summed and the PID controller 152 generates a final PID correction value. The final PID correction value is used to control the water injector 140. The water injector 140 may increase or decrease the amount of water into the hydrogen stream to achieve the second target dew point.

In the step 210, the system 100 may enter into the third mode and save information related to the amount of control of water in the air and hydrogen streams in the KAM 152. The first KAM table includes stored learned values that are associated with the amount of water in the air stream. The first KAM table may store a single point, or multiple points of data which relate to a function of airflow. The first KAM table may control the amount of water in the air stream based on learned airflow points.

The second KAM table includes stored learned values that are associated with the amount of water in the hydrogen stream. The second KAM table may store a single point, or multiple points of data which relate to a function of stack current. The second KAM table may control the amount of water in the hydrogen stream based on the learned stack current points. The learned airflow rates and stack current in the first and second KAM tables supplement predefined airflow rates and stack currents in the first and second feed forward tables and provide for increased control in the amount of water in the air and hydrogen streams.

In the step 212, the controller 120 determines the pulse width of the first and second PWM signals that are sent to the water injectors 116 and 142. The water injectors 116 and 142 may increase the amount of water in the air and hydrogen streams based on the length of the pulse width in the first and second PWM signals. The controller 120 determines the length of the pulse width by calculating the total amount of water flow as determined by the controller 120 when the system 100 is in the first, second and third mode. For example, the controller 120 may sum the water flow rate as determined by the first feed forward table in the first mode, the water rate which corresponds to the final PID corrected value and the water rate which corresponds to a learned airflow rate to determine the pulse width of the first PWM signal for controlling the amount of water in the air stream.

The controller 120 determines the length of the pulse width for the first PWM signal by summing the water flow rate as determined by the second feed forward table in the first mode, the water rate which corresponds to the final PID corrected value when the system 100 is in the second mode, and the water rate which corresponds to a learned airflow rate when the system 100 is in the third mode for controlling the amount of water in the air stream.

The controller 120 determines the length of the pulse width for the second PWM signal by summing the water flow rate as determined by the second feed forward table in the first mode, the water rate which corresponds to the final PID corrected value when the system 100 is in the second mode, and the water rate which corresponds to a learned stack current value when the system 100 is in the third mode for controlling the amount of water in the hydrogen stream.

Figure 3:
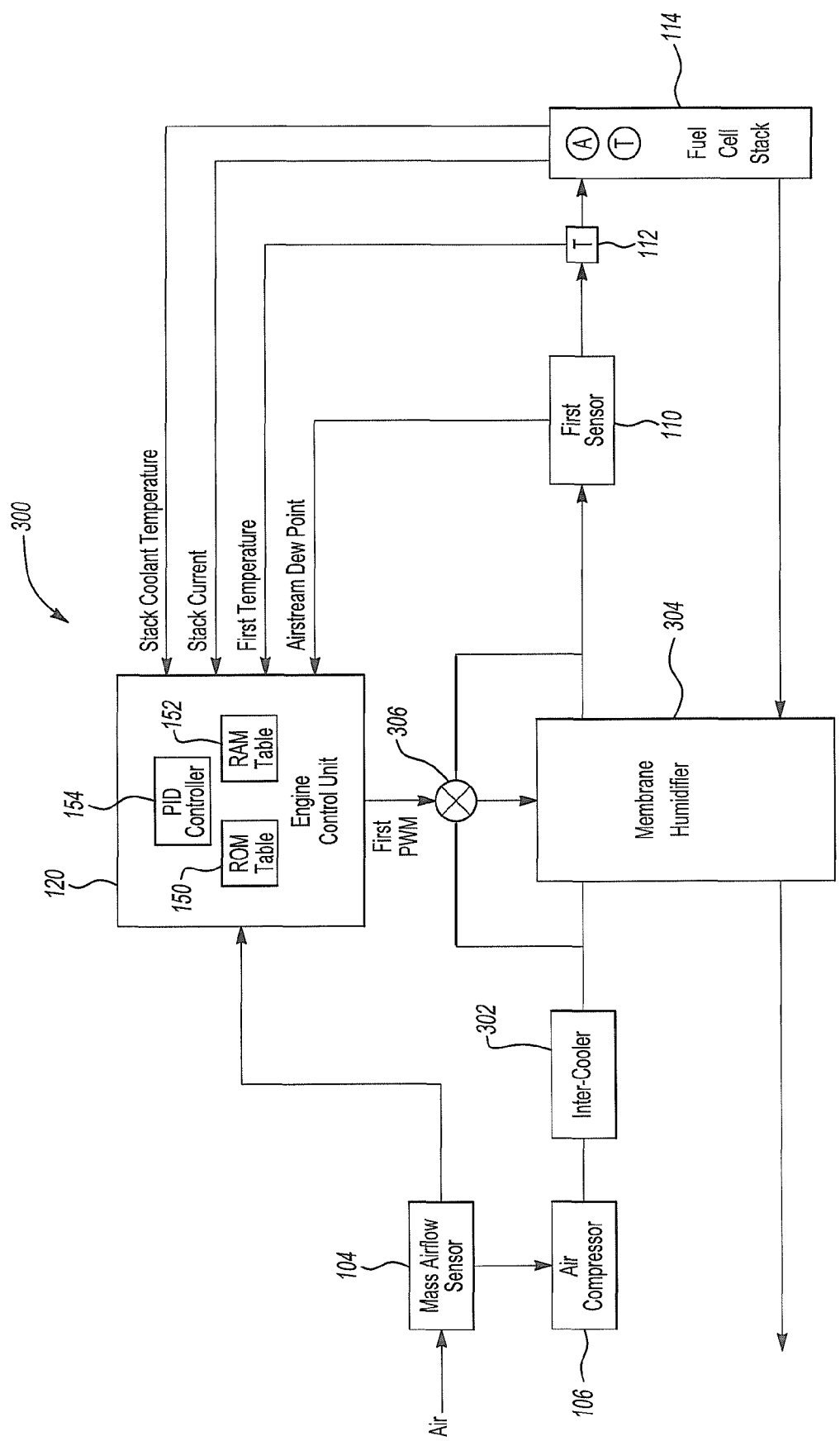
FIG. 3 illustrate an alternate embodiment of a fuel cell stack humidity control system which controls the amount of water that is being added to an air stream and a hydrogen stream.

Referring to FIG. 3, a alternate embodiment of fuel cell stack system 300 is shown for controlling the amount of water in an air stream. The mass airflow sensor 104 measures the flow rate of the air stream and presents a signal to the controller 120 which corresponds to the measured flow rate. An inter-cooler device 302 is positioned after the air compressor 106 and regulates the temperature of the air stream.

A membrane humidifier 304 receives the regulated air stream from the inter-cooler device 302 and adds water in the stream to add moisture in the air. The membrane humidifier 304 includes material that absorbs water from the exhaust system (e.g., the stream presented by the fuel cell stack 114). In general, the exhaust stream includes a high water content. The material of the humidifier 304 allows for water to transfer from the humidified air stream exiting from the fuel cell stack 114 into the incoming air stream (e.g., the air stream presented by the air compressor 106). The inter-cooler device 302 may reduce the charge temperature of the air stream (e.g., the air stream received by the air compressor 106) to protect membranes (not shown) in the fuel cell stack 114 from damage.

The bypass valve 306 is electrically coupled to the controller 120 and is configured to receive the first PWM signal. The controller 120 may control the bypass valve 306 in order to control the amount of air that is passed through the membrane humidifier 304.

As more air is passed through the bypass valve, less water is added into the air stream. As less air is passed through the bypass valve 306, more water is added into the air stream. The flow rate of water in the membrane humidifier 304 is generally constant. The controller 120 is configured to control the amount of air that is passed through the membrane humidifier 304 instead of the amount of water that is passed through the membrane humidifier 304.

In one example, the bypass valve 306 may be positioned between the inter-cooler device 302 and the membrane humidifier 304. In such an example, the bypass valve 306 may be implemented as a three-way valve which allows for a complete bypass of air away from the humidifier 304. In a first position, the bypass valve 306 may be in an open mode and allow the entire amount of air in the stream to pass through the humidifier. In a second position, the bypass valve 306 may be in a bypass mode, where air is prevented from entering into the humidifier 304. In a third position, the bypass valve 306 may be in a mix position where a portion of the air stream is directed away from the humidifier 304 and the remaining portion of air is directed into the humidifier 304. The particular type of valve 306 and the positioning of the valve 306 may be varied to meet the design criteria of a particular implementation.

The first sensor 110 measures the dew point in the air stream. The temperature sensor 112 measures the temperature of the air after the first sensor 110 has measured the dew point in the air. An inlet of the fuel cell stack 114 receives the humidified air and delivers water to each membrane in a fuel cell stack 114. The fuel cell stack 114 delivers water to the membrane humidifier 304. The fuel cell stack 114 generates the water by combining the oxygen in the air stream with the hydrogen. Such a combination also provides an electrical current which can be used by an electric motor (not shown) to drive a vehicle. The fuel cell stack 114 outputs the water to the membrane humidifier 304. The membrane humidifier 304 uses the water generated from the fuel cell stack 114 to add humidity back into the air stream.

The system 300 is configured to operate in the first, second and third modes as explained in connection with the embodiments of the invention shown in FIGS. 1-2. Accordingly, the controller 120 may control the amount of water in the air stream by controlling the amount of air that is passed through the membrane humidifier 304 with the bypass valve 304. For example, while in the first mode, the first and second feed forward tables may continue to use measured airflow rates to allow the controller 120 to control the amount of water in the air stream. The only difference in the system 300 when compared to the system 100, is that controller 120 controls the amount of air that is passed through the membrane humidifier 304.

While in the second mode, the controller 120 may control the bypass valve 120 based on the final PID correction value. Such a value may provide for greater control over the bypass valve. Likewise, in the third mode, the controller 120 may adapt and learn values which correspond to values of control with the bypass valve 306. The control strategy implemented with the system 300 is the same when compared to the control strategy of the system 100.

While FIG. 3 illustrates the implementation of the air stream in the system 300, it should be understood that the system 100 may be adapted to further include a membrane humidifier to add water into a hydrogen stream. Such an embodiment may also include an additional dew point sensor and temperature sensor. The controller 120 may control the amount of fresh hydrogen that is passed through the membrane humidifier with an additional bypass valve. The controller 120 may use the same control strategy as noted in connection with FIGS. 1-2 for controlling the bypass valve. Such control over the bypass valve may increase or decrease the amount of hydrogen through the membrane humidifier thereby increasing or decreasing the amount of water that is added to the hydrogen stream.

While the best mode for carrying out the invention has been described in detail, those familiar with the art to which this invention relates will recognize various alternative designs and embodiments for practicing the invention as defined by the following claims.

What is claimed:

1. A system for controlling the amount of water in at least one fluid stream that is delivered to a fuel cell stack in a vehicle, the system comprising:
   a humidifier arrangement configured to provide water to the at least one fluid stream;
   a first controller configured to:
      receive at least one first signal indicative of an amount of water in the at least one fluid stream;
      store predefined information therein corresponding to a first defined amount of water to be provided to the at least one fluid stream;
      receive a temperature signal indicative of whether the system is in one of a first mode and a second mode,
      control the humidifier arrangement to provide the water to the at least one fluid stream in accordance to the predefined information in response to the first signal if the system is in the first mode; and
      dynamically generate new information that was not previously stored in the controller if the system is in the second mode, the new information for being stored in the controller and being indicative of a second defined amount of water to be provided to the at least one fluid stream.

2. The system of claim 1 wherein the temperature signal corresponds to a temperature of the at least one fluid stream measured about the fuel cell stack.

3. The system of claim 2 is in the first mode if the temperature of the at least one fluid stream is below a predetermined temperature level.

4. The system of claim 2 is in the second mode if the temperature of the at least one fluid stream is above a predetermined temperature level.

5. The system of claim 1 wherein the first controller is further configured to determine a first difference corresponding to a difference between a target dew point of the at least one fluid stream and a measured target dew point of the at least one fluid stream when the system is in the second mode.

6. The system of claim 5 wherein the first controller includes a proportional, integral, and derivative (PID) controller configured to dynamically generate the new information with the first difference.

7. The system of claim 6 wherein the target dew point is a function of coolant temperature of the fuel cell stack, an amount of time that has elapsed since the vehicle has started, and fuel cell stack current.

8. A system for controlling the amount of water in at least one fluid stream that is delivered to a fuel cell stack, the system comprising:
 a humidifier arrangement configured to provide water to the at least one fluid stream;
 a first controller configured to:
  receive at least one first signal indicative of an amount of water in the at least one fluid stream;
  store predefined information therein corresponding to a first defined amount of water to be provided to the at least one fluid stream;
  receive a temperature signal indicative of whether the system is in one of a first mode and a second mode,
  control the humidifier arrangement to provide the water to the at least one fluid stream in accordance to the predefined information in response to the first signal if the system is in the first mode; and
  dynamically generate new information to supplement the predefined information if the system is in the second mode, the new information for being stored in the controller and being indicative of a second defined amount of water to be provided to the at least one fluid stream.

9. The system of claim 8 wherein the temperature signal corresponds to a temperature of the at least one fluid stream measured about the fuel cell stack.

10. The system of claim 9 is in the first mode if the temperature of the at least one fluid stream is below a predetermined temperature level.

11. The system of claim 9 is in the second mode if the temperature of the at least one fluid stream is above a predetermined temperature level.

12. The system of claim 8 wherein the first controller is further configured to determine a first difference corresponding to a difference between a target dew point of the at least one fluid stream and a measured target dew point of the at least one fluid stream if the system is in the second mode.

13. The system of claim 12 wherein the first controller includes a proportional, integral, and derivative (PID) controller configured to dynamically generate the new information with the first difference.

* * * * *